(12) United States Patent
Chang et al.

(10) Patent No.: US 8,875,225 B2
(45) Date of Patent: Oct. 28, 2014

(54) METHOD, APPARATUS AND SYSTEM FOR OBTAINING USER INFORMATION

(75) Inventors: Heng Chang, Shenzhen (CN); Weiliang Chen, Shenzhen (CN); Xiaomin Shi, Makati (PH); Qifeng Ma, Shenzhen (CN); Huan Wang, Shenzhen (CN); Shan Chen, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 13/492,086

(22) Filed: Jun. 8, 2012

(65) Prior Publication Data

US 2012/0246716 A1    Sep. 27, 2012

Related U.S. Application Data

(63) Continuation of application No. PCT/CN2010/079653, filed on Dec. 10, 2010.

(30) Foreign Application Priority Data

Dec. 10, 2009  (CN) .......................... 2009 1 0225431

(51) Int. Cl.
*H04L 29/06* (2006.01)
*G06F 15/16* (2006.01)
*G06F 21/00* (2013.01)

(52) U.S. Cl.
CPC ............. *H04L 63/102* (2013.01); *G06F 21/00* (2013.01); *G06F 2221/2101* (2013.01); *G06F 2221/2105* (2013.01); *G06F 2221/2141* (2013.01)
USPC ......................... 726/1; 726/4; 726/12; 726/27

(58) Field of Classification Search
None
See application file for complete search history.

(56) References Cited

U.S. PATENT DOCUMENTS 7,353,532 B2 *  4/2008  Duri et al. .......................... 726/1
7,792,756 B2 *  9/2010  Plastina et al. ................... 705/51

(Continued)

FOREIGN PATENT DOCUMENTS

CN     101379508 A     3/2009
CN     101459821 A     6/2009

(Continued)

OTHER PUBLICATIONS

International Search Report and Written Opinion of the International Searching Authority issued in corresponding PCT Patent Application No. PCT/CN2010/079653, mailed Mar. 17, 2011.

(Continued)

*Primary Examiner* — Christopher Revak
(74) *Attorney, Agent, or Firm* — Brinks Gilson & Lione

(57) ABSTRACT

A method, apparatus and system for obtaining user information are disclosed by the present invention. The present invention solves the problem of lower security of user information. The method includes: obtaining the interactive state of the service requester in the service request process, wherein the interactive state is used for indicating the specific state in which the service requester and its service are during the process of interaction with each other; determining if the interactive state of the service requester, in the process of requesting the service, meets the preset access-authorized-policy of the user information in the service request; when the interactive state of the service requester, in the process of requesting the service, meets the preset access-authorized-policy of the user information in said service request, obtaining the user information and sending the user information to the service.

5 Claims, 8 Drawing Sheets

(56) References Cited

U.S. PATENT DOCUMENTS

| | | | |
|---|---|---|---|
| 7,881,315 B2* | 2/2011 | Haveson et al. | 370/401 |
| 8,145,532 B2* | 3/2012 | Jones et al. | 705/26.1 |
| 8,516,601 B2* | 8/2013 | Goodwin et al. | 726/26 |
| 8,768,788 B2* | 7/2014 | Jones et al. | 705/27.1 |
| 2002/0161636 A1 | 10/2002 | Takahashi et al. | |
| 2003/0005071 A1 | 1/2003 | Kanoh | |
| 2003/0074456 A1 | 4/2003 | Yeung et al. | |
| 2004/0054918 A1* | 3/2004 | Duri et al. | 713/200 |
| 2004/0054919 A1* | 3/2004 | Duri et al. | 713/200 |
| 2006/0212713 A1* | 9/2006 | Hatakeda | 713/182 |
| 2006/0277185 A1 | 12/2006 | Sato et al. | |
| 2007/0245409 A1 | 10/2007 | Harris et al. | |
| 2007/0271618 A1* | 11/2007 | Chao et al. | 726/27 |
| 2008/0000964 A1 | 1/2008 | Flake et al. | |
| 2008/0103829 A1* | 5/2008 | Mankopf et al. | 705/3 |
| 2008/0154886 A1 | 6/2008 | Podowski et al. | |
| 2009/0077618 A1* | 3/2009 | Pearce et al. | 726/1 |
| 2009/0165103 A1* | 6/2009 | Cho et al. | 726/6 |
| 2010/0185871 A1* | 7/2010 | Scherrer et al. | 713/186 |
| 2014/0119540 A1* | 5/2014 | Pearson et al. | 380/44 |

FOREIGN PATENT DOCUMENTS

| | | |
|---|---|---|
| CN | 101521598 A | 9/2009 |
| EP | 1307019 A1 | 5/2003 |
| WO | WO 03/049000 A1 | 6/2003 |

OTHER PUBLICATIONS

Huawei, "Developing Windows Live: Windows Live ID Delegated Authentication SDK for Application Providers" Jun. 14, 2012.

Seo, "Draft Standard for a Next Generation Service Overlay Network" IEEE P1903, Dec. 2008.

Extended European Search Report issued in corresponding European Patent Application No. 10835501.7, mailed Nov. 5, 2012.

Office Action issued in corresponding Chinese Patent Application No. 200910225431.7, mailed Jan. 16, 2013.

* cited by examiner

METHOD, APPARATUS AND SYSTEM FOR OBTAINING USER INFORMATION

CROSS-REFERENCE TO RELATED APPLICATION

This application is a continuation of International Application No. PCT/CN2010/079653, filed on Dec. 10, 2010, which claims priority to Chinese Patent Application No. 200910225431.7, filed on Dec. 10, 2009, both of which are hereby incorporated by reference in their entireties.

FIELD OF THE INVENTION

The present invention relates to the communication field, and particularly, to a method, an apparatus and a system for obtaining user information.

BACKGROUND OF THE INVENTION

In the existing communication system, the service server may need to obtain user information of a user when providing services to the user. In this case, the service server may acquire a token for accessing the user information through intermediate equipment (e.g., the Live ID server in the Microsoft windows live technique), and then obtain the user information of the user from an interactive server by using the token. During the implementation of the present invention, the inventor finds that the prior art has the following problem: by using the token, the service server can access the interactive server to obtain the user information of the user at any time, which is adverse to the security protection of the user information, and there is a risk that the user information may be abused.

SUMMARY OF THE INVENTION

The embodiments of the present invention provide a method, an apparatus and a system for obtaining user information to improve the security of the user information.

The embodiments of the present invention adopt the following technical solutions:

A method for obtaining user information, comprising: obtaining an interactive state of a service requester in a service request process, wherein the interactive state is used for indicating a specific state in which the service requester and the service are during the process of interaction with each other; judging whether the interactive state of the service requester in the service request process meets a preset access-authorized-policy of the user information in the service request; and obtaining the user information when the interactive state of the service requester in the service request process meets the access-authorized-policy of the user information in the service request, and sending the user information to the service.

A method for obtaining user information, comprising: recording an interactive state of a service requester in a service request process, wherein the interactive state is used for indicating a specific state in which the service requester and the service are during the process of interaction with each other; and sending the interactive state of the service requester in the service request process to an identity proxy, so that the identity proxy obtains user information according to the interactive state of the service requester in the service request process.

A method for obtaining user information, comprising: obtaining an interactive state of a service requester in a service request process, wherein the interactive state is used for indicating a specific state in which the service requester and the service are during the process of interaction with each other; judging whether the interactive state of the service requester in the service request process meets a preset access-authorized-policy of the user information in the service request; generating an one-off authorization instruction for obtaining the user information when the interactive state of the service requester in the service request process meets the access-authorized-policy of the user information in the service request; and sending the one-off authorization instruction for obtaining user information to the service, so that the service obtains user information for one time according to the one-off authorization instruction for obtaining the user information.

An identity proxy, comprising: a first obtaining module configured to obtain an interactive state of a service requester in a service request process, wherein the interactive state is used for indicating a specific state in which the service requester and the service are during the process of interaction with each other; a judging module configured to judge whether the interactive state of the service requester in the service request process obtained by the first obtaining module meets a preset access-authorized-policy of the user information in the service request; a second obtaining module configured to obtain the user information when the judging module judges that the interactive state of the service requester in the service request process meets the access-authorized-policy of the user information in the service request; and a first sending module configured to send the user information obtained by the second obtaining module to the service.

An interactive state obtaining apparatus, comprising: a recording module configured to record an interactive state of a service requester in a service request process, wherein the interactive state is used for indicating a specific state in which the service requester and the service are during the process of interaction with each other; and a sending module configured to send the interactive state of the service requester in the service request process recorded by the recording module to an identity proxy, so that the identity proxy obtains the user information according to the interactive state of the service requester in the service request process.

An identity proxy, comprising: an obtaining module configured to obtain an interactive state of a service requester in a service request process, wherein the interactive state is used for indicating the specific state in which the service requester and the service are during the process of interaction with each other; a judging module configured to judge whether the interactive state of the service requester in the service request process obtained by the obtaining module meets a preset access-authorized-policy of the user information in the service request; a generation module configured to generate an one-off authorization instruction for obtaining the user information when the judging module judges that the interactive state of the service requester in the service request process meets the access-authorized-policy of the user information in the service request; and a sending module configured to send the one-off authorization instruction generated by the generation module for obtaining user information to the service, so that the service obtains the user information for one time according to the one-off authorization instruction for obtaining the user information.

A communication system, comprising: an identity proxy configured to obtain an interactive state of a service requester in a service request process, obtain the user information when the interactive state of the service requester in the service request process meets a preset access-authorized-policy of user information in the service request, and send the user information to the service, wherein the interactive state is used for indicating the specific state in which the service requester and the service are during the process of interaction with each other; and an interactive state obtaining apparatus configured to record the interactive state of the service requester in the service request process, and send the interactive state of the service requester in the service request process to the identity proxy.

A communication system, comprising: an identity proxy configured to obtain an interactive state of a service requester in a service request process, generate an one-off authorization instruction for obtaining the user information when the interactive state of the service requester in the service request process meets an access-authorized-policy of the user information, and send the one-off authorization instruction for obtaining the user information to the service, so that the service obtains the user information for one time according to the one-off authorization instruction for obtaining the user information, wherein the interactive state is used for indicating the specific state in which the service requester and the service are during the process of interaction with each other; and an interactive state obtaining apparatus configured to record the interactive state of the service requester in the service request process, and send the interactive state of the service requester in the service request process to the identity proxy.

When the interactive state of the service requester in the service request process meets the access-authorized-policy of the user information in the service request, i.e., the service execution state of the service request allows accessing the user information, the method, apparatus and system for obtaining the user information provided by the embodiments of the present invention obtain the user information, so as to achieve the purpose of flexibly controlling the open of the user information according to the service execution state, thereby reducing the potential risk of abusing the user information and improving the security of the user information.

BRIEF DESCRIPTION OF THE DRAWINGS

In order to more clearly describe the technical solutions of the prior art or the embodiments of the present invention, the drawings to be used in the descriptions of the prior art or the embodiments are briefly introduced as follows. Obviously, the following drawings just illustrate some embodiments of the present invention, and a person skilled in the art can obtain other drawings from these drawings without paying a creative effort.

DETAILED DESCRIPTION OF THE PREFERRED EMBODIMENTS

The technical solutions of the embodiments of the present invention will be clearly and completely described as follows in conjunction with the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

In order to solve the problem of poor security of user information, the embodiments of the present invention provide a method, an apparatus and a system for obtaining user information.

Embodiment 1

Figure 1:
FIG. 1 is a structure diagram of a communication system provided by Embodiment 1.

As shown in FIG. 1, this embodiment provides a communication system, including an identity proxy 101 and an interactive state obtaining apparatus 102.

The identity proxy 101 is configured to obtain an interactive state of a service requester in a service request process. When the interactive state of the service requester in the service request process meets a preset access-authorized-policy of user information in the service request, the identity proxy 101 obtains the user information and sends it to the service, wherein the interactive state is used for indicating the specific state in which the service requester and the service are during the process of interaction with each other.

The interactive state obtaining apparatus 102 is configured to record the interactive state of the service requester in the service request process, and send the interactive state of the service requester in the service request process to the identity proxy 101.

In which, the interactive state obtaining apparatus 102 may be a service router or a service requester. In this embodiment, the interactive state obtaining apparatus for example is the service router.

Figure 2:
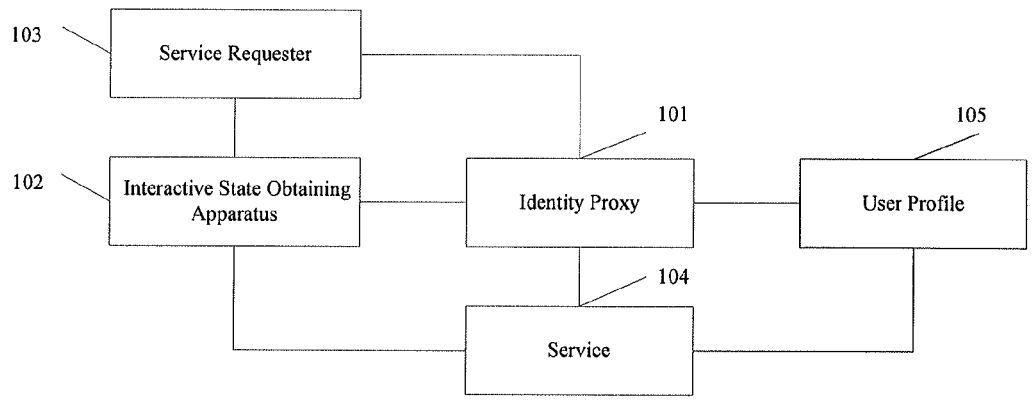
FIG. 2 is another structure diagram of the communication system as shown in FIG. 1.

Further, as illustrated in FIG. 2, the communication system according to this embodiment may include a service requester 103, a service 104 and a User Profile 105.

Firstly, the network entities in the communication system are briefly introduced.

The service requester 103 is configured to initiate a service access request.

The service 104 is configured to provide a service to the service requester according to the user information, in response to the service access request of the service requester 103.

The User Profile 105 is configured to store the user information.

In which, the user information is the related data for describing certain characteristics of the user, and it serves as a basis for the service to provide the service requester with a personalized service capability. In the practical network, the user information is widely distributed and provided by different content providers. Each content provider may provide one type or more types of user information. For example, a user provides the user information of social relation through the website Facebook, and then provides the personal basic user information through a certain dating website. Since the user has multiple types of characteristics to be described, the network will standardize the user information based on the requirement of interoperability. For example in the service superposition network, the network suggests providing the user information in the form of standardized User Profile, and a standardized User Profile is corresponding to a specific type of user information.

When the service provides a service to the service requester, the service sends an user information obtaining request to the identity proxy in case the service wants to obtain the user information (e.g., user information of the service requester or user information of the friend of the service requester), and the identity proxy obtains the interactive state of the service requester in the service request process from the service router. In which, the value of the interactive state is a pre-defined standard state value or a private state value customized by the service. When the interactive state of the service requester in the service request process meets a preset access-authorized-policy of user information in the service request, the user information is obtained and sent to the service. The service continues to provide personalized services to the service requester according to the user information.

When the interactive state of the service requester in the service request process meets the preset access-authorized-policy of user information in the service request, i.e., the service execution state of the service request allows accessing the user information, the communication system according to the embodiment obtains the user information, so as to achieve the purpose of flexibly controlling the open of the user information according to the service execution state, thereby reducing the potential risk of abusing the user information and improving the security of the user information.

Embodiment 2

This embodiment provides another communication system, including an identity proxy and an interactive state obtaining apparatus.

The identity proxy is configured to obtain the interactive state of a service requester in a service request process, generate an one-off authorization instruction for obtaining user information when the interactive state of the service requester in the service request process meets an access-authorized-policy of user information, and send the one-off authorization instruction to the service, so that the service obtains user information for one time according to the one-off authorization instruction.

The interactive state obtaining apparatus is configured to record the interactive state of the service requester in the service request process, and send the interactive state to the identity proxy.

When the interactive state of the service requester in the service request process meets the access-authorized-policy of user information in the service request, i.e., the service execution state of the service request allows accessing the user information, the communication system according to the embodiment obtains the user information, so as to achieve the purpose of flexibly controlling the open of the user information according to the service execution state, thereby reducing the potential risk of abusing user information and improving the security of the user information.

In conjunction with the communication system provided by the embodiment of the present invention, network entities in the communication system are introduced as follows:

Embodiment 3

Figure 3:
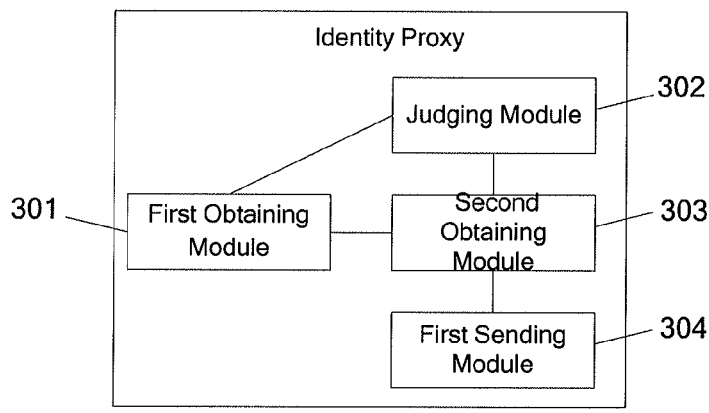
FIG. 3 is a structure diagram of an identity proxy provided by Embodiment 3.

As illustrated in FIG. 3, the identity proxy according to the embodiment includes:

a first obtaining module 301, configured to obtain an interactive state of a service requester in a service request process, wherein the interactive state is used for indicating a specific state in which the service requester and the service are during the process of interaction with each other;

a judging module 302, configured to judge whether the interactive state of the service requester in the service request process obtained by the first obtaining module 301 meets a preset access-authorized-policy of user information in the service request;

a second obtaining module 303, configured to obtain the user information when the judging module 302 judges that the interactive state of the service requester in the service request process meets the access-authorized-policy of user information in the service request; and a first sending module 304, configured to send the user information obtained by the second obtaining module 303 to the service.

Figure 4:
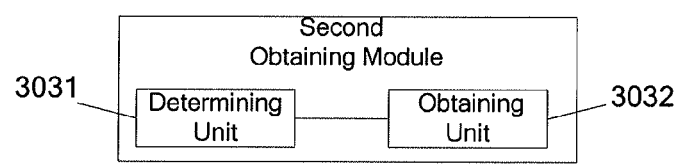
FIG. 4 is a structure diagram of a second obtaining module as shown in FIG. 3.

Further, as illustrated in FIG. 4, the second obtaining module 303 may include:

a determining unit 3031, configured to determine a content provider; and an obtaining unit 3032, configured to obtain the user information from the content provider determined by the determining unit 3031.

Figure 5:
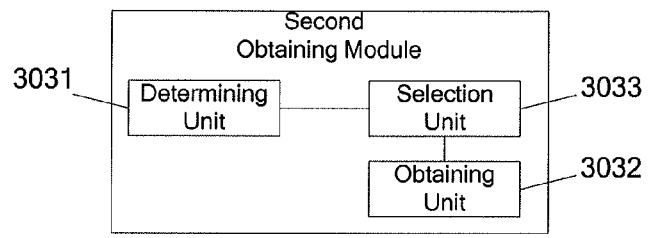
FIG. 5 is another structure diagram of the second obtaining module shown in FIG. 3.

Further, as illustrated in FIG. 5, the second obtaining module 303 may also include:

a selection unit 3033, configured to select, if the determining unit 3031 determines a plurality of content providers, a target content provider from the plurality of content providers according to a preset selection policy.

Correspondingly, the obtaining unit 3032 may also be configured to obtain the user information from the target content provider selected by the selection unit 3033.

Figure 6:
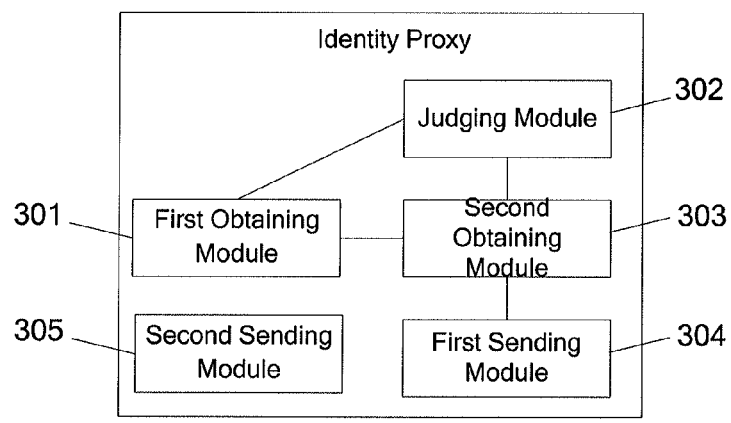
FIG. 6 is another structure diagram of the identity proxy as shown in FIG. 3.

Further, as illustrated in FIG. 6, the identity proxy may also include:

a second sending module 305, configured to send to a service router or a service requester a configuration instruction for recording the interactive state of the service requester in the service request process, according to the access-authorized-policy of user information.

In this embodiment, the identity proxy may further include a storage module configured to store a control policy of user information, such as access-authorized-policy of user information or selection policy of user information. The control policy of user information may be set by a network operator, a target user of the user information, or a content provider that provides the user information. For example, the operator may set a general access-authorized-policy of user information that authorizes a certain category of service in a specific interactive state to access a specific type of user information of the service requester. Herein the various conditions are omitted.

In order that the second obtaining module 303 obtains the user information, the User Profile that stores the user information shall be determined, and the identity proxy may further include:

a user information management module, configured to manage the user information stored in the User Profile of the network.

In which, the user information management module may specifically include:

an information receiving sub-module, configured to provide a registration platform to the User Profile of the network, receive from the User Profile service registration information including content access address, type of the user information, etc., receive from the User Profile user registration information including user identity mark contained in the User Profile, and receive from the service a user information obtaining request; and an information management sub-module, configured to create associations between the identity mark, the user information, the type of the user information and the content access address, according to the service registration information and the user registration information received by the information receiving sub-module.

In this embodiment, the information management sub-module may store the service registration information and the user registration information in a form of the file stored in the service catalog of the user information, such as file number, and the file content includes the name of the User Profile, the content access address, the type of the user information and the contained user identity mark. Further, the file content may also include information such as the provider of the User Profile and the used security mechanism.

As the user has multiple identify marks in the network, the information management module may further include a mapping management sub-module configured to map different identify marks of the user.

In this embodiment, the user has two identities, i.e., a global identity mark and a local identity mark. In which, the global identity is mainly used for the user to access and register to the network, and used for the determination of user identity in the identity proxy. The local identity mark is applied in general services or the User Profile to identify the user's account information in a service provided by the network, or mark a target user to which the user information belongs in the User Profile. For example, a user has a global identity mark A, a local identity mark B at the forum, and a local identity mark C at the shopping website. After the information receiving sub-module receives the user's multiple identify marks, the mapping management sub-module establishes the mapping relations between the user's global identity mark and the local identity marks, i.e., the mapping relations between the user's global identity mark A, the local identity mark B at the forum and the local identity mark C at the shopping website.

In this embodiment, the mapping management sub-module may manage the mapping relations in the form of user identity catalog, wherein the user identity catalog includes the user's global identity mark, the local identity mark in each service and each User Profile, and the mapping relations between different identity marks (including the mapping relation between the global and local identity marks, and the mapping relation between different local identity marks).

In conjunction with the storage module and the user information management module, the process of obtaining the user information by the identity proxy is as follows.

During the service execution, when the service requires the user information, it sends a user information obtaining request to the information receiving sub-module, wherein the user information obtaining request may include: the content of the user information, usually one or more variables of the user information; a service mark for indicating which service sends the user information obtaining request; an identity mark of the target user for indicating the user from which the user information is obtained, which may be either a global identity mark or a local identity mark; and an identity mark of the service requester for indicating the requester of the service, which also may be either a global identity mark or a local identity mark. Further, the user information obtaining request may include: the type of the user information and/or the content access address of the User Profile that stores the user information.

To be noted, the target user may be the same as or different from the service requester. For example, when the service wants to obtain the user information of a friend of the service requester, the identity mark of the target user is the identity mark of the friend of the service requester rather than that of the service requester. If the user information obtaining request does not simultaneously contain the target user and the service requester, defaulting that the target user is the same as the service requester.

After receiving the user information obtaining request, the first obtaining module obtains the interactive state of the service requester in the service request process from the service router, obtains the access-authorized-policy of user information from the storage module, and determines whether the interactive state of the service requester in the service request process meets the access-authorized-policy of user information; if meets, the second obtaining module obtains the user information.

In this embodiment, the steps in which the second obtaining module obtains the user information specifically include: firstly, the second obtaining module determines the user information is stored in which User Profile; during the determination, the second obtaining module determines, in the user information management module, the User Profile (content provider) that stores the user information, according to the user information related information provided by the user information obtaining request (the identify mark of the target user, the content of the user information and/or the type of the user information, etc.). The second obtaining module may find that the requested user information is included in multiple User Profiles. In that case, the second obtaining module may obtain the selection policy of user information from the storage module, and select a target User Profile according to the selection policy of user information sent from the storage module.

After the User Profile is determined, the second obtaining module sends a user information obtaining request to the User Profile. The user information obtaining request may include an identity mark for indicating the user from which the user information shall be obtained. The identity mark may be either a global identity mark or a local identity mark. In this embodiment, the local identity mark is taken as an example. According to the identity mark of a target user provided by the user information obtaining request sent by the service, the second obtaining module searches the user information management module for corresponding local identity mark which has a mapping relation with the identity mark of the target user and is in the corresponding User Profile.

When the interactive state of the service requester in the service request process meets the access-authorized-policy of user information in the service request, i.e., the service execution state of the service request allows accessing the user information, the identity proxy according to the embodiment obtains the user information, so as to achieve the purpose of flexibly controlling the open of the user information according to the service execution state, thereby reducing the potential risk of abusing user information and improving the security of the user information.

Embodiment 4

Figure 7:
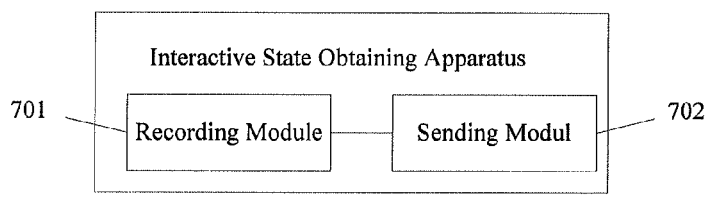
FIG. 7 is a structure diagram of an interactive state obtaining apparatus provided by Embodiment 4.

As illustrated in FIG. 7, the interactive state obtaining apparatus according to the embodiment of the present invention includes:

a recording module 701 configured to record an interactive state of a service requester in a service request process, wherein the interactive state is used for indicating a specific state in which the service requester and the service are during the process of interaction with each other; and a sending module 702 configured to send the interactive state of the service requester in the service request process recorded by the recording module 701 to an identity proxy, so that the identity proxy obtains user information according to the interactive state of the service requester in the service request process.

Figure 8:
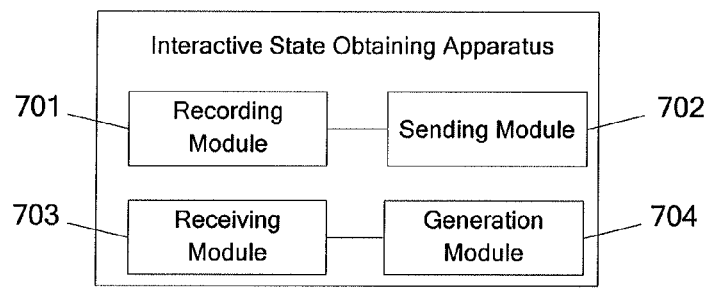
FIG. 8 is another structure diagram of the interactive state obtaining apparatus as shown in FIG. 7.

Optionally, as illustrated in FIG. 8, the interactive state obtaining apparatus may further include:

a receiving module 703 configured to receive a configuration instruction for recording the interactive state of the service requester in the service request process sent by the identity proxy; and a generation module 704 configured to generate the interactive state of the service requester in the service request process, according to the configuration instruction for recording the interactive state of the service requester in the service request process received by the receiving module 703.

Figure 9:
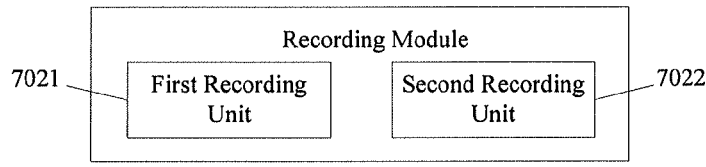
FIG. 9 is a structure diagram of a recording module as shown in FIG. 7.

Further, as illustrated in FIG. 9, the recording module 702 may include:

a first recording unit 7021 configured to receive a service interaction message, and record the interactive state of the service requester in the service request process according to the service interaction message; or a second recording unit 7022 configured to receive interactive state recording instruction information sent by the service requester, and record the interactive state of the service requester in the service request process according to the interactive state recording instruction information.

According to this embodiment, the interactive state obtaining apparatus as illustrated in FIGS. 7 to 9 may be a service router or a service requester.

In this embodiment, the configuration instruction for recording the interactive state of the service requester in the service request process is used to describe that the interactive state of the service requester in the service request process needs to be recorded by the interactive state obtaining apparatus when a certain service is called by a certain service requester. The configuration instruction for recording the interactive state of the service requester in the service request process may include the service requester's identity mark and the service mark. When the service requester initiates a service access request, the interactive state obtaining apparatus determines whether the interactive state of the service requester in the service request process shall be recorded, according to the configuration instruction for recording the interactive state of the service requester in the service request process, and generate the interactive state of the service requester in the service request process in case the configuration instruction for recording the interactive state of the service requester in the service request process requires a recording.

In this embodiment, the manners for managing the interactive states of the service requester in the service request process are shown in the following table:

TABLE 1

| List of Interactive States | | |
|---|---|---|
| Identity Mark of service Request | service Mark | State Value |
| User1 | service1 | s1 |
| User2 | service2 | s2 |
| ... | | |

Wherein the state value is used for indicating a specific state in which the service requester and its service are during the process of interaction with each other, and specifically may be a predefined standard state value or a private state value customized by the service (e.g., the numeral 1 indicates an initial state)

To be noted, the methods for managing the interactive states are clearly known to a person skilled in the art, but not limited herein, for example, a variable for describing the interactive state may be added to the list. Since the implementations are various, they are omitted for brevity.

When the interactive state of the service requester in the service request process meets the access-authorized-policy of user information in the service request, i.e., the service execution state of the service request allows accessing the user information, the user information obtaining apparatus provided by the embodiment obtains the user information, so as to achieve the purpose of flexibly controlling the open of the user information according to the service execution state, thereby reducing the potential risk of abusing the user information and improving the security of the user information.

Embodiment 5

Figure 10:
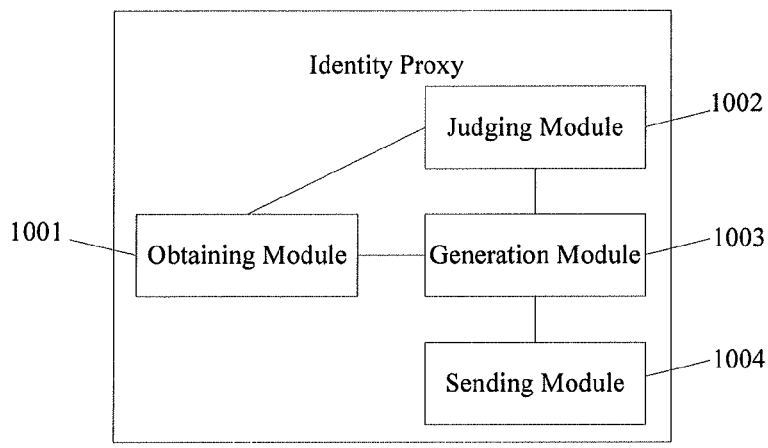
FIG. 10 is a structure diagram of an identity proxy provided by Embodiment 5.

As illustrated in FIG. 10, the identity proxy according to the embodiment of the present invention includes:

an obtaining module 1001 configured to obtain an interactive state of a service requester in a service request process, wherein the interactive state is used for indicating the specific state in which the service requester and the service are during the process of interaction with each other;

a judging module 1002 configured to judge whether the interactive state of the service requester in the service request process obtained by the obtaining module 1001 meets a preset access-authorized-policy of user information in the service request;

a generation module 1003 configured to generate an one-off authorization instruction for obtaining user information when the interactive state of the service requester in the service request process meets the access-authorized-policy of user information in the service request; and a sending module 1004 configured to send the one-off authorization instruction generated by the generation module 1003 for obtaining user information to the service, so that the service obtains user information according to the one-off authorization instruction for obtaining user information.

When the interactive state of the service requester in the service request process meets the access-authorized-policy of user information in the service request, i.e., the service execution state of the service request allows accessing the user information, the identity proxy provided by the embodiment obtains the user information, so as to achieve the purpose of flexibly controlling the open of the user information according to the service execution state, thereby reducing the potential risk of abusing the user information and improving the security of the user information.

Embodiment 6

Figure 11:
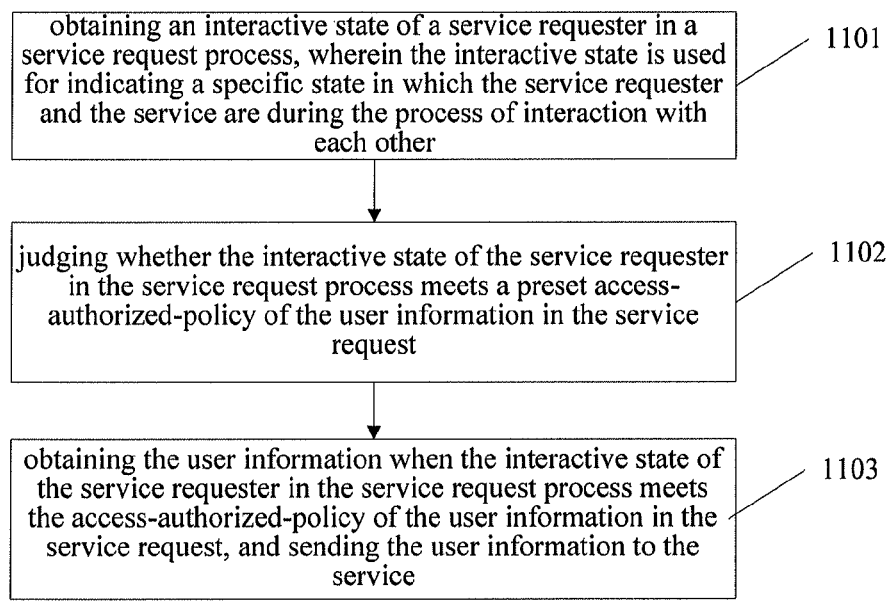
FIG. 11 is a flowchart of a method for obtaining user information provided by Embodiment 6.

As illustrated in FIG. 11, the embodiment of the present invention provides a method for obtaining user information, including:

Step 1101: obtaining an interactive state of a service requester in a service request process, wherein the interactive state is used for indicating a specific state in which the service requester and the service are during the process of interaction with each other;

Step 1102: judging whether the interactive state of the service requester in the service request process meets a preset access-authorized-policy of user information in the service request;

Step 1103: obtaining user information when the interactive state of the service requester in the service request process meets the access-authorized-policy of user information in the service request, and sending the user information to the service.

When the interactive state of the service requester in the service request process meets the access-authorized-policy of user information in the service request, i.e., the service execution state of the service request allows accessing the user information, the method for obtaining user information provided by the embodiment obtains the user information, so as to achieve the purpose of flexibly controlling the open of the user information according to the service execution state, thereby reducing the potential risk of abusing the user information and improving the security of the user information.

Embodiment 7

Figure 12:
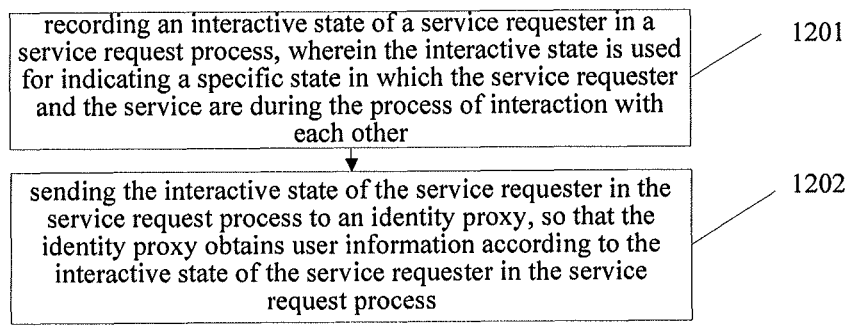
FIG. 12 is a flowchart of another method for obtaining user information provided by Embodiment 7.

As illustrated in FIG. 12, the embodiment of the present invention provides another method for obtaining user information, including:

Step 1201: recording an interactive state of a service requester in a service request process, wherein the interactive state is used for indicating a specific state in which the service requester and the service are during the process of interaction with each other;

Step 1202: sending the interactive state of the service requester in the service request process to an identity proxy, so that the identity proxy obtains the user information according to the interactive state of the service requester in the service request process.

The method for obtaining user information provided by this embodiment records the interactive state of the service requester in the service request process, and sends the interactive state of the service requester in the service request process to the identity proxy, so that the identity proxy determines whether to allow accessing the user information, according to the interactive state of the service requester in the service request process, so as to achieve the purpose of flexibly controlling the open of the user information according to the service execution state, thereby reducing the potential risk of abusing the user information and improving the security of the user information.

Embodiment 8

Figure 13:
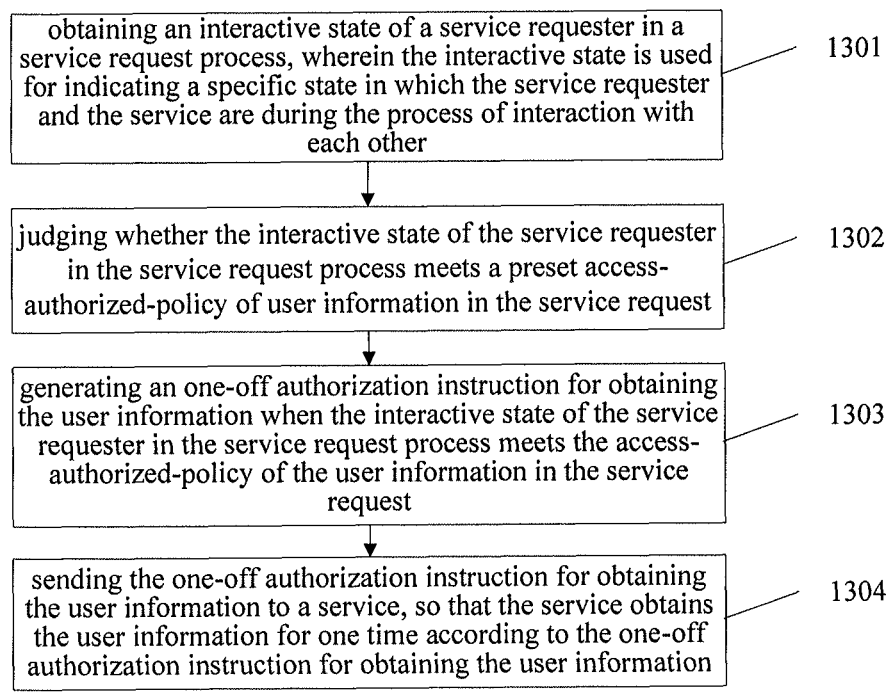
FIG. 13 is a flowchart of still another method for obtaining user information provided by Embodiment 8.

As illustrated in FIG. 13, the embodiment of the present invention provides still another method for obtaining user information, including:

Step 1301: obtaining an interactive state of a service requester in a service request process, wherein the interactive state is used for indicating a specific state in which the service requester and the service are during the process of interaction with each other;

Step 1302: judging whether the interactive state of the service requester in the service request process meets a preset access-authorized-policy of user information in the service request;

Step 1303: generating an one-off authorization instruction for obtaining user information when the interactive state of the service requester in the service request process meets the access-authorized-policy of user information in the service request;

Step 1304: sending the one-off authorization instruction for obtaining user information to the service, so that the service obtains user information for one time according to the one-off authorization instruction for obtaining user information.

When the interactive state of the service requester in the service request process meets the access-authorized-policy of user information in the service request, i.e., the service execution state of the service request allows accessing the user information, the method for obtaining user information provided by the embodiment obtains the user information, so as to achieve the purpose of flexibly controlling the open of the user information according to the service execution state, thereby reducing the potential risk of abusing the user information and improving the security of the user information.

With reference to the descriptions of the method, apparatus and system provided by the embodiments of the present invention, there are two patterns for obtaining the user information in the present invention: one is that the identity proxy sends a user information obtaining request to a required User Profile after finding the position of the User Profile in a proxy mode, and forwards the result to the service after obtaining the requested user information. The other is a redirect mode, i.e., the identity proxy returns the concrete information such as the content access address to the service after finding the position of the required User Profile, and then the service directly requests the required user information from the User Profile. Comparatively speaking, the first pattern simplifies the flow of the user information access, provides a stronger control capability, realizes the isolation between the user requester and the provider, sufficiently ensures the security of the user information, and uses the mechanism consistency, thus the first pattern is more suitable to serve as a solution in the network system. Since the above advantages are brought by obtaining the user information through the proxy mode, the following embodiment is described with the proxy mode.

Figure 14:
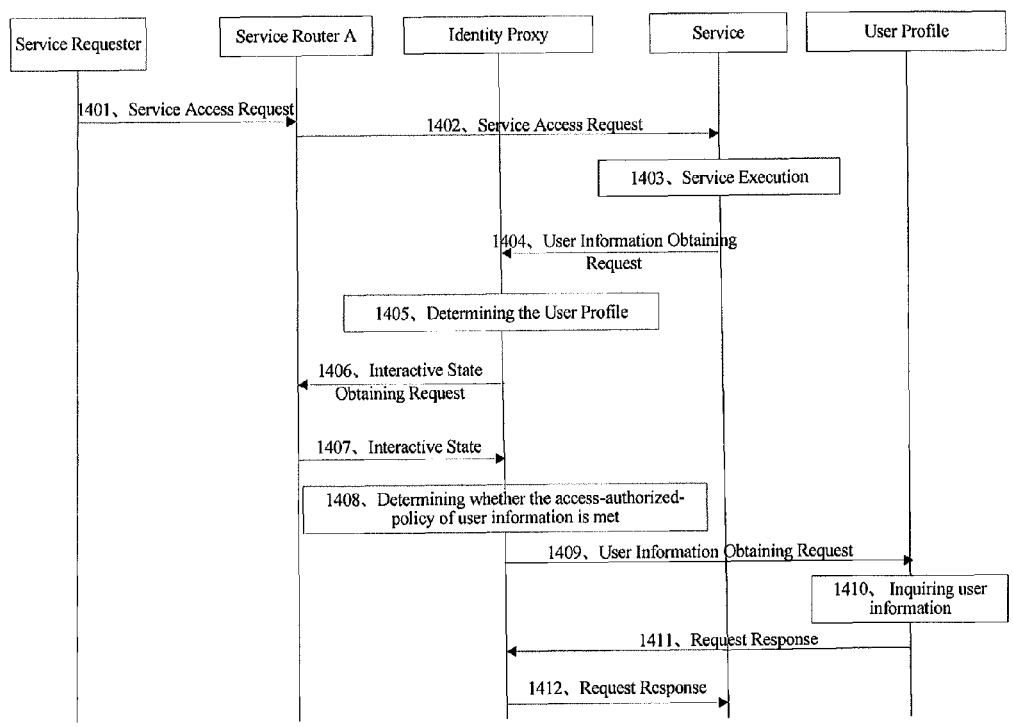
FIG. 14 is a flowchart of a method for obtaining user information provided by Embodiment 9.

The method for obtaining user information provided by the embodiment of the present invention is further described as follows in conjunction with the system and apparatus provided by the embodiments of the present invention. As illustrated in FIG. 14, the concrete process is as follows.

Embodiment 9

Step 1401: a service requester sends a service access request including an identify mark of the service requester.

In this embodiment, the identify mark may be either a global identify mark or a local identify mark in a service, depending on the requirement of the service.

Step 1402: a service router A forwards the service access request to the service.

The service router A is an access service router of the service requester. It is responsible for enabling the service requester to access the network and routing the data of the service requester.

Step 1403: the service provides a service to the service requester according to the service access request.

Step 1404: during the service execution, when the service requires user information, it sends a user information obtaining request to an identity proxy.

For example, when providing a travel service to the service requester, the service shall provide a trip scheduling service to the service requester. In that case, the service needs to obtain physical position information of the service requester, which is one kind of user information. At that time, the service sends the user information obtaining request to the identity proxy.

Step 1405: the identity proxy determines the User Profile that stores the user information according to the user information obtaining request.

In the embodiment of the present invention, after receiving the user information obtaining request, the identity proxy firstly performs an identity authentication for the service that imitates the obtaining request. When the identity authentication succeeds, the identity proxy determines the User Profile that stores the user information.

After the identity proxy determines corresponding User Profile, step 1406 shall be performed to obtain the access authority of the User Profile.

Step 1406: the identity proxy obtains an interactive state of the service requester in the service request process from the service router A.

Step 1407: the service router A sends the interactive state of the service requester in the service request process.

In the embodiment of the present invention, the service router A sends the interactive state of the service requester in the service request process. There are two methods for the service router A to record the interactive state of the service requester in the service request process: one method is to receive interactive state recording instruction information voluntarily sent by the service requester after the service requester receives a service interaction message, and record the interactive state of the service requester in the service request process according to the state value carried in the interactive state recording instruction information. The other method is after receiving the service interaction message which carries service execution state indication information (e.g., the service interactive use the SIP protocol), to convert it into corresponding interactive state of the service requester in the service request process through the service execution state indication information such as a state code.

Figure 15:
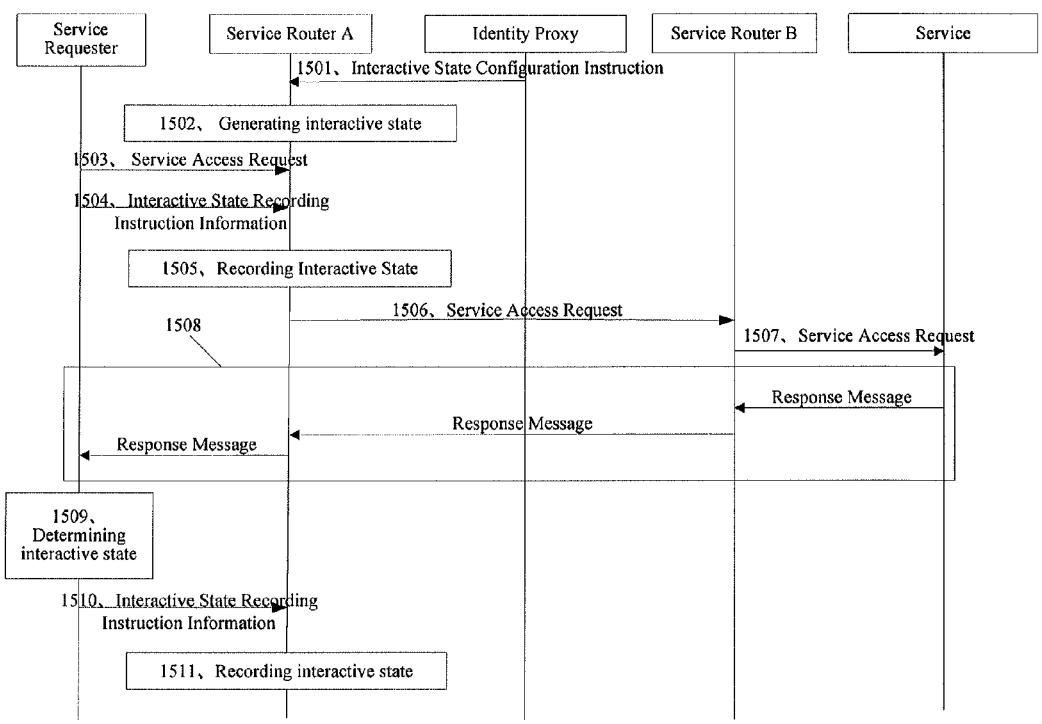
FIG. 15 is a flowchart of recording the interactive state by a service router in Embodiment 9.

Firstly introduced is the first method as illustrated in FIG. 15, including:

Step 1501: the identity proxy sends to the service router A a configuration instruction for recording the interactive state of the service requester in the service request process.

In the embodiment of the present invention, the identity proxy determines that user information is required while which service requesters access what services according to the access-authorized-policy of user information, and the identity proxy notifies the service router A to record corresponding interactive state by sending a configuration instruction for recording the interactive state of the service requester in the service request process, which carries the service requester's identity mark and the service mark. For example, when the service requested by the service requester is a travel service, and in consideration that the physical position information of the service requester shall be obtained during the service execution, the configuration instruction requires generating and recording an interactive state (UI State) of the service requester in the travel service request process. In the embodiment of the present invention, the service requester's identity mark may be either a global identity mark or a local identity mark.

Step 1502: the service router A generates the interactive state of the service requester in the service request process according to the configuration instruction for recording the interactive state of the service requester in the service request process.

Step 1503: the service requester sends a service access request to the service router A.

Step 1504: the service requester sends instruction information for recording the interactive state to the service router A.

The instruction information for recording the interactive state includes an identity mark, a service mark and an interactive state, wherein the identity mark and the service mark are used for notifying the service router A as to the interactive state of which service requester in which service is changed.

Step 1505: after receiving the service access request sent by the service requester, the service router A records the interactive state of the service requester in the service request process as "requesting".

In the embodiment of the present invention, the service router A obtains an identity mark and a service mark in the service access request, and determines whether the interactive state of the service requester in the service request process shall be recorded according to the identity mark and the service mark. According to the configuration instruction for recording the interactive state of the service requester in the service request process, the service router A records corresponding interactive state for the service access request of the service requester, and stores it in a list of service interactive states.

Step 1506: the service router A sends the service access request to a service router B to which the service belongs; if the service requester and the service belong to the same service router, i.e., the service router A is the same with the service router B, this step will be omitted.

Step 1507: the service router B forwards the service access request to the service.

Step 1508: after receiving the service access request, the service authenticates the service requester's identity, and sends a response message to the service requester.

Step 1509: the service requester determines the current interactive state according to the content of the response message.

In the embodiment of the present invention, the service is a travel service, including interactive states such as "requesting", "trip scheduling", "hotel reservation", etc., and the service requester determines the current interactive state.

Step 1510: the service requester sends the determined interactive state to the service router A.

In the embodiment of the present invention, the service requester sends interactive state recording instruction information to the service router A, including an identity mark, a service mark and the changed interactive state, wherein the identity mark and the service mark are used for notifying the service router A as to the interactive state of which service requester in which service is changed.

Step 1511: the service router A records the interactive state of the service requester in the service request process, according to the interactive state sent by the service requester.

Figure 16:
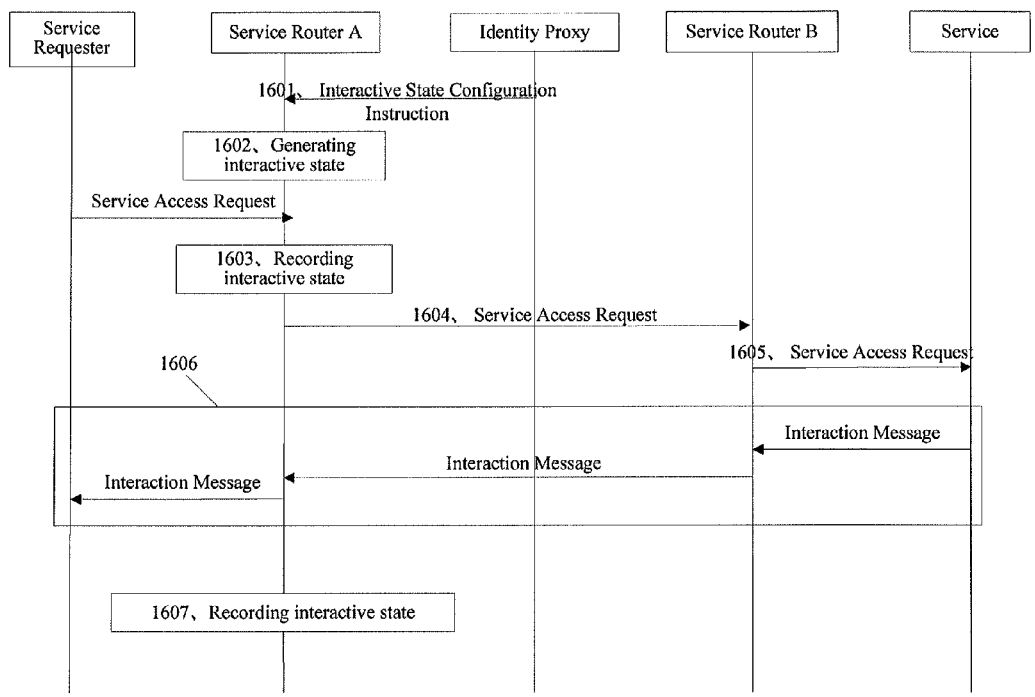
FIG. 16 is another flowchart of recording the interactive state by the service router in Embodiment 9.

Optionally, another method for recording the interactive state provided by this embodiment is substantially the same as the above process, and as illustrated in FIG. 16, the distinction is that the service router A receives an interaction message of the service, obtains information (e.g. a state code) indicating the service execution state in the interaction message, determines the interactive state of the service currently called by the service requester, and records the interactive state into corresponding state value.

After the service router A sends the interactive state of the service requester in the service request process to the identity proxy, step 1408 will be performed.

Step 1408: the identity proxy determines whether the access-authorized-policy of user information is met according to the interactive state of the service requester in the service request process.

This step may further include presetting the access-authorized-policy of user information that includes more than one interactive states and the information indicating the access authority of the interactive states. For example, the interactive states of the travel service may include trip scheduling and hotel reservation, wherein access-authorized-policy corresponding to the trip scheduling may allow obtaining physical position information of the user, and access-authorized-policy corresponding to the hotel reservation may allow obtaining user information such as physical position information and personal identity information of the user. When the identity proxy determines to allow accessing the user information, step 1409 will be performed.

Step 1409: the identity proxy sends a user information obtaining request to the User Profile determined in step 1405.

Step 1410: the User Profile searches for the user information in the obtaining request.

Step 1411: the User Profile sends a request response to the identity proxy.

In the embodiment of the present invention, in case the user information is obtained, e.g., it is obtained that the current physical position information of the service requester is the World Window of Shenzhen, the obtaining result of the World Window of Shenzhen is added to the request response; otherwise the obtaining failure will be notified, and failure reason (e.g., no matched user information is searched) may be further given.

Step 1412: the identity proxy forwards the received request response to the service.

Figure 17:
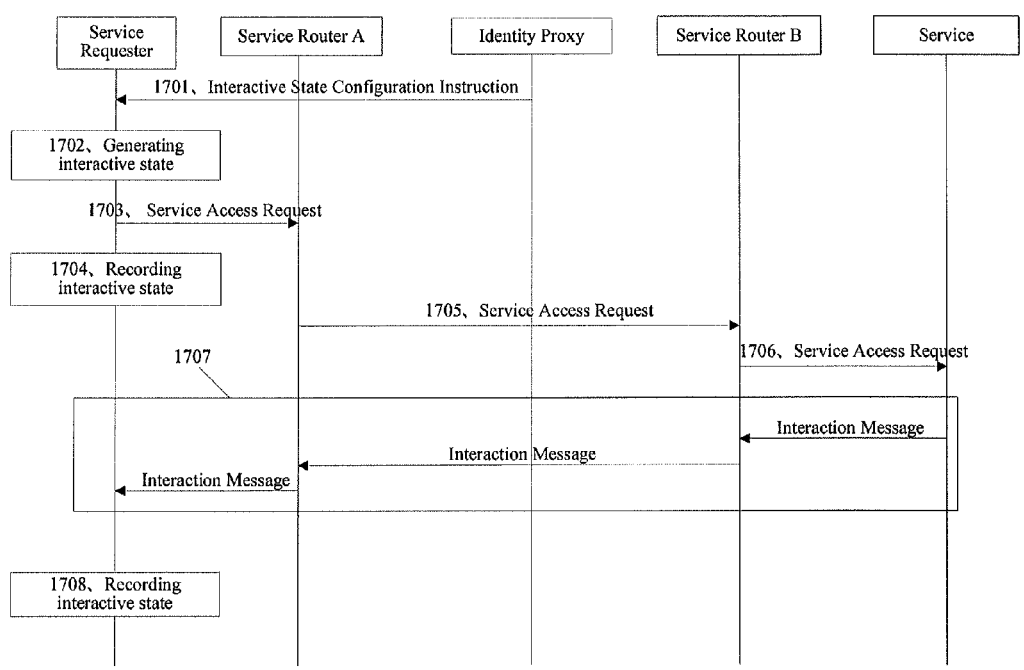
FIG. 17 is a flowchart of recording the interactive state by a service requester in Embodiment 9.

To be noted, the embodiment of the present invention describes an example in which the identity proxy obtains the interactive state from the service router, but is not limited thereto. The identity proxy may also obtain the interactive state from the service requester. The process of recording the interactive state by the service requester is illustrated in FIG. 17, which differs from the process of recording the interactive state by the service router in that the service requester directly records the interactive state according to the interaction message.

According to the method for obtaining user information provided by the embodiment, When the interactive state of the service requester in the service request process meets the access-authorized-policy of user information in the service request, i.e., the service execution state of the service request allows accessing the user information, the user information is obtained, so as to achieve the purpose of flexibly controlling the open of the user information according to the service execution state, thereby reducing the potential risk of abusing the user information and improving the security of the user information.

A person skilled in the art will be appreciated that all or a part of the steps of various methods in the above embodiments may be completed by related hardware instructed by a program. The program may be stored in a computer readable storage medium, including ROM, RAM, magnetic disk, optical disk, etc.

The above descriptions are just preferred embodiments of the present invention, and the protection scope of the present invention is not limited thereto. Any change or replacement that can be easily conceived by a person skilled in the art within the technical scope disclosed by the present invention shall be covered by the protection scope of the present invention. Therefore, the protection scope of the present invention shall be subjected to the protection scope of the claims.

What is claimed is:

1. A method for obtaining user information in an identity proxy, comprising:
    obtaining an interactive state of a service requester in a service request process, wherein the interactive state indicates a service execution state of the service request during the process of interaction between the service requester and a service;
    determining whether the interactive state of the service requester meets a preset access-authorized-policy of the user information requested by the service; and
    sending an one-off authorization instruction for obtaining user information to a User Profile when the interactive state of the service requester in the service request process meets the access-authorized-policy of the user information;
    obtaining the user information included in a request response from the User Profile; and
    forwarding the received request response comprising the user information to the service.

2. The method according to claim 1, wherein before obtaining the interactive state of the service requester in the service request process, the method further comprising:
    sending to a service router or the service requester a configuration instruction for recording the interactive state of the service requester in the service request process according to the access-authorized-policy of the user information.

3. An identity proxy, comprising:
    a first obtaining module configured to obtain an interactive state of a service requester in a service request process, wherein the interactive state indicates a service execution state of the service request during the process of interaction between the service requester and a service;
    a judging module configured to determine whether the interactive state of the service requester obtained by the first obtaining module meets a preset access-authorized-policy of the user information requested by the service;
    a second obtaining module configured to send a user information obtaining request to a User Profile when the judging module determines that the interactive state of the service requester in the service request process meets the access-authorized-policy of the user information and obtain the user information included in a request response from the User Profile; and
    a first sending module configured to forward the received request response comprising the user information obtained by the second obtaining module to the service.

4. The identity proxy according to claim 3, further comprising:

a second sending module configured to send to a service router or the service requester a configuration instruction for recording the interactive state of the service requester in the service request process according to the access-authorized-policy of the user information.

5. A method implemented in a communication system, comprising:
    obtaining an interactive state of a service requester in a service request process, wherein the interactive state indicates a specific state in which the service requester and the service are during the process of interaction with each other;
    determining whether the interactive state of the service requester in the service request process meets a preset access-authorized-policy of user information in the service request;
    generating an one-off authorization instruction for obtaining user information when the interactive state of the service requester in the service request process meets the access-authorized-policy of user information in the service request; and
    sending the one-off authorization instruction for obtaining user information to the service.

* * * * *